(No Model.)

J. P. LUTES.
LISTER CULTIVATOR.

No. 368,894. Patented Aug. 23, 1887.

WITNESSES:
Chas. Nidg.
C. Sedgwick

INVENTOR:
J. P. Lutes
BY Munn & Co.
ATTORNEYS.

UNITED STATES PATENT OFFICE.

JOSEPH P. LUTES, OF RIDGELEY, MISSOURI.

LISTER-CULTIVATOR.

SPECIFICATION forming part of Letters Patent No. 368,894, dated August 23, 1887.

Application filed May 24, 1887. Serial No. 239,226. (No model.)

*To all whom it may concern:*

Be it known that I, JOSEPH P. LUTES, of Ridgeley, in the county of Platte and State of Missouri, have invented a new and Improved Lister-Cultivator, of which the following is a full, clear, and exact description.

My invention relates to a cultivator specially adapted for working listed corn, and has for its object to improve the construction of such, whereby the cultivator will work the corn in the gutters or furrows made by the lister, and at the same time smooth the ridges between the corn and feed fresh soil to the same.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
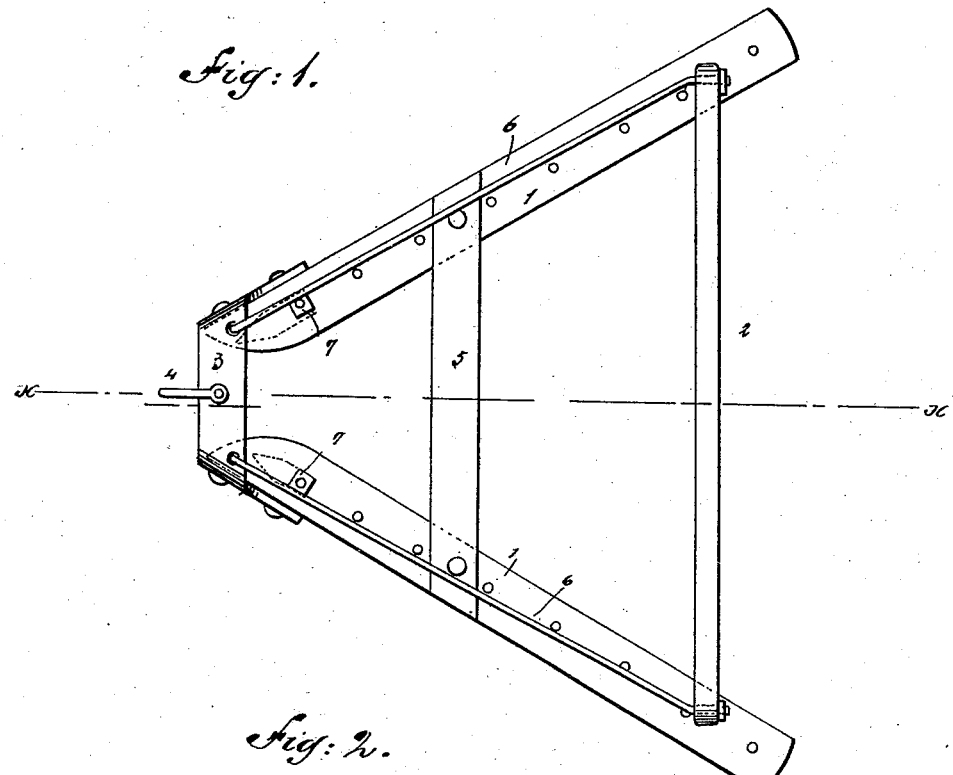
Figure 2:
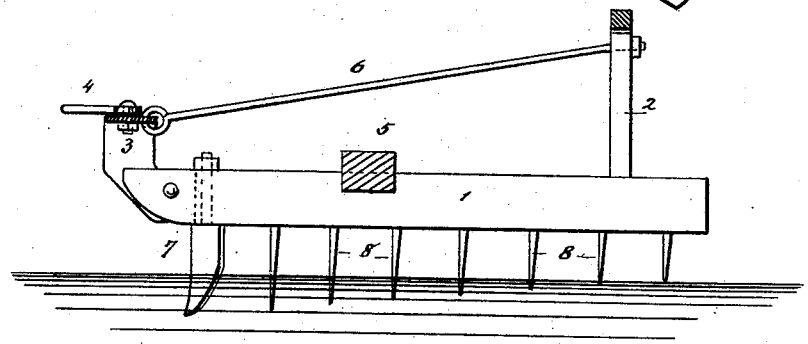
Figure 3:
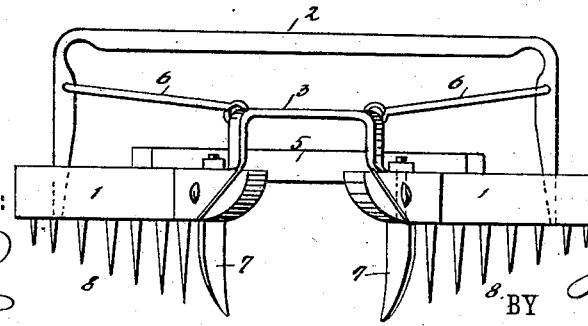

Figure 1 is a plan view of the cultivator, and Fig. 2 is a longitudinal central and vertical section on line $x\ x$ of Fig. 1. Fig. 3 is a front elevation.

In carrying out the invention, the side beams, 1, of the cultivator are so placed with respect to each other as to form substantially the sides of a triangle, the beams being united at their heels upon top by a strong bow, 2, made, preferably, of ash or similar wood, and at the front by a metal arched bar, 3, to the upper central portion of which the clevis 4 is swiveled, to which clevis doubletrees are adapted for attachment.

The body of the cultivator is further strengthened by a transverse beam, 5, attached at each end to the side beams, as shown in Fig. 1, and also through the medium of side braces, 6, preferably of metal, which braces connect at each side the arched bar 3 and the bow 2.

At the forward end of each beam shovels 7 are adjustably secured, the shanks of said shovels being made to pass up through the beams, as shown in Fig. 2, where they are retained in position by a suitable nut. These shovels may be about six inches in length from the bottom of the frame. In addition to the shovels about fourteen teeth, 8, are arranged at equidistance apart, which teeth are graduated from front to rear, the teeth next the shovels being between five and six inches in length, and the last tooth at the heel about four inches long. The design of this arrangement of the teeth is to cause the cultivator to work the same depth at the top of a ridge between the rows as in the furrow near the corn. The aforesaid series of teeth 8 loosen the ground upon the ridges, but leave it there, so that when the corn becomes large enough for regular cultivation plenty of dirt will be available for hilling up. The shovels are adapted to straddle the rows and plow the hard ground left at each side of the furrow made by the lister, which is not reached by other farming implements.

The purpose of the bow at the heels is to regulate the balance of the cultivator, and also free it from trash. If the cultivator should choke in the front, by throwing the weight upon the bow the front is elevated and the trash is allowed to drop, and if the choking is at the heel the cultivator is raised from the ground at that point also by means of the bow. It will be observed from the foregoing description that the cultivator is particularly adapted to follow a lister, and that it automatically adjusts itself to the ridges between the rows, thoroughly cultivating the young corn.

The side braces, 6, may, if found desirable, be attached to the cross-bar 5, as well as to the yoke 2 and arched bar 3. It will be observed that as the arched bar 3 is fastened upon the outer converging ends of the beams 1 and the clevis 4 is pivoted centrally the said bar, the cultivator drawn by said clevis will have a steady forward movement and be prevented from wabbling when running in a furrow.

Having thus described my invention, what I claim as new, and desire to secure by Letters Patent, is—

1. A harrow of substantially triangular form, provided with shovels 7 at the forward ends of its beams, and with teeth 8, decreasing in length from front to rear, substantially as herein shown and described.

2. The herein-described cultivator, consisting of the beams 1, the arched bars 2 and 3, the braces 6, the shovels 7 in the front ends of the beams, and the teeth 8, decreasing in length from the front to the rear, substantially as herein shown and described.

JOSEPH P. LUTES.

Witnesses:
A. R. JACK,
W. L. MOORE.